US012650619B2

(12) United States Patent
Sobu et al.

(10) Patent No.: US 12,650,619 B2
(45) Date of Patent: Jun. 9, 2026

(54) DELAY CONTROL CIRCUIT, OPTICAL TRANSMISSION APPARATUS, AND DELAY CONTROL METHOD

(71) Applicant: 1FINITY Inc., Kawasaki (JP)

(72) Inventors: Yohei Sobu, Shinagawa (JP); Yukito Tsunoda, Sagamihara (JP)

(73) Assignee: 1FINITY Inc., Kawasaki (JP)

( * ) Notice: Subject to any disclaimer, the term of this patent is extended or adjusted under 35 U.S.C. 154(b) by 268 days.

(21) Appl. No.: 18/665,086

(22) Filed: May 15, 2024

(65) Prior Publication Data

US 2024/0419021 A1      Dec. 19, 2024

(30) Foreign Application Priority Data

Jun. 19, 2023      (JP) ................................. 2023-100050

(51) Int. Cl.
| | |
|---|---|
| *G02F 1/00* | (2006.01) |
| *G02F 1/01* | (2006.01) |
| *G02F 1/21* | (2006.01) |
| *G02F 1/225* | (2006.01) |

(52) U.S. Cl.
CPC ............ *G02F 1/0123* (2013.01); *G02F 1/212* (2021.01); *G02F 1/225* (2013.01)

(58) Field of Classification Search
CPC ........ G02F 1/0123; G02F 1/212; G02F 1/225; G02F 1/0305; B82Y 20/00; G02B 26/001; G02B 26/0841

USPC ......................................................... 359/245
See application file for complete search history.

(56) References Cited

U.S. PATENT DOCUMENTS

2016/0020853 A1      1/2016   Akiyama

FOREIGN PATENT DOCUMENTS

| | | | | |
|---|---|---|---|---|
| EP | 2001148 A1 * | 12/2008 | ........... | G02F 1/2255 |
| JP | 2016-025380 | 2/2016 | | |
| WO | 2014/103231 | 7/2014 | | |

* cited by examiner

*Primary Examiner* — Henry Duong
(74) *Attorney, Agent, or Firm* — Fujitsu Intellectual Property Center

(57) ABSTRACT

A delay control circuit includes a delay circuit configured to provide a predetermined delay to signals input to a plurality of electrode segments provided in series along one or both of two waveguides forming a Mach-Zehnder interferometer of an optical modulator, a control circuit configured to select two electrode segments from the plurality of electrode segments, and control a delay amount between the two electrode segments that are selected, a frequency filter configured to extract a predetermined frequency component from output light of the Mach-Zehnder interferometer, in a state where identical signals that vary at random are input to the two electrode segments, and a monitor configured to monitor a power of the extracted predetermined frequency component. The control circuit controls the delay amount between the two electrode segments based on a monitored result of the extracted predetermined frequency component.

15 Claims, 13 Drawing Sheets

DELAY ADJUSTED

+5 psec

+10 psec

+15 psec

| FILTER CENTER FREQUENCY (GHz) | ADJUSTMENT RANGE (psec) |
| --- | --- |
| 5 | ~±100 |
| 10 | ~±50 |
| 20 | ~±25 |
| 50 | ~±10 |
| 100 | ~±5 |

MONITORED LIGHT INTENSITY

B

A

DELAY DEVIATION AMOUNT (psec)

FILTER CENTER FREQUENCY OF 50 GHz (±5 GHz)

FILTER CENTER FREQUENCY OF 96 GHz (±5 GHz)

DELAY DIFFERENCE BETWEEN SEGMENTS: 0 psec

DELAY DIFFERENCE BETWEEN SEGMENTS: 5 psec

FIG.10

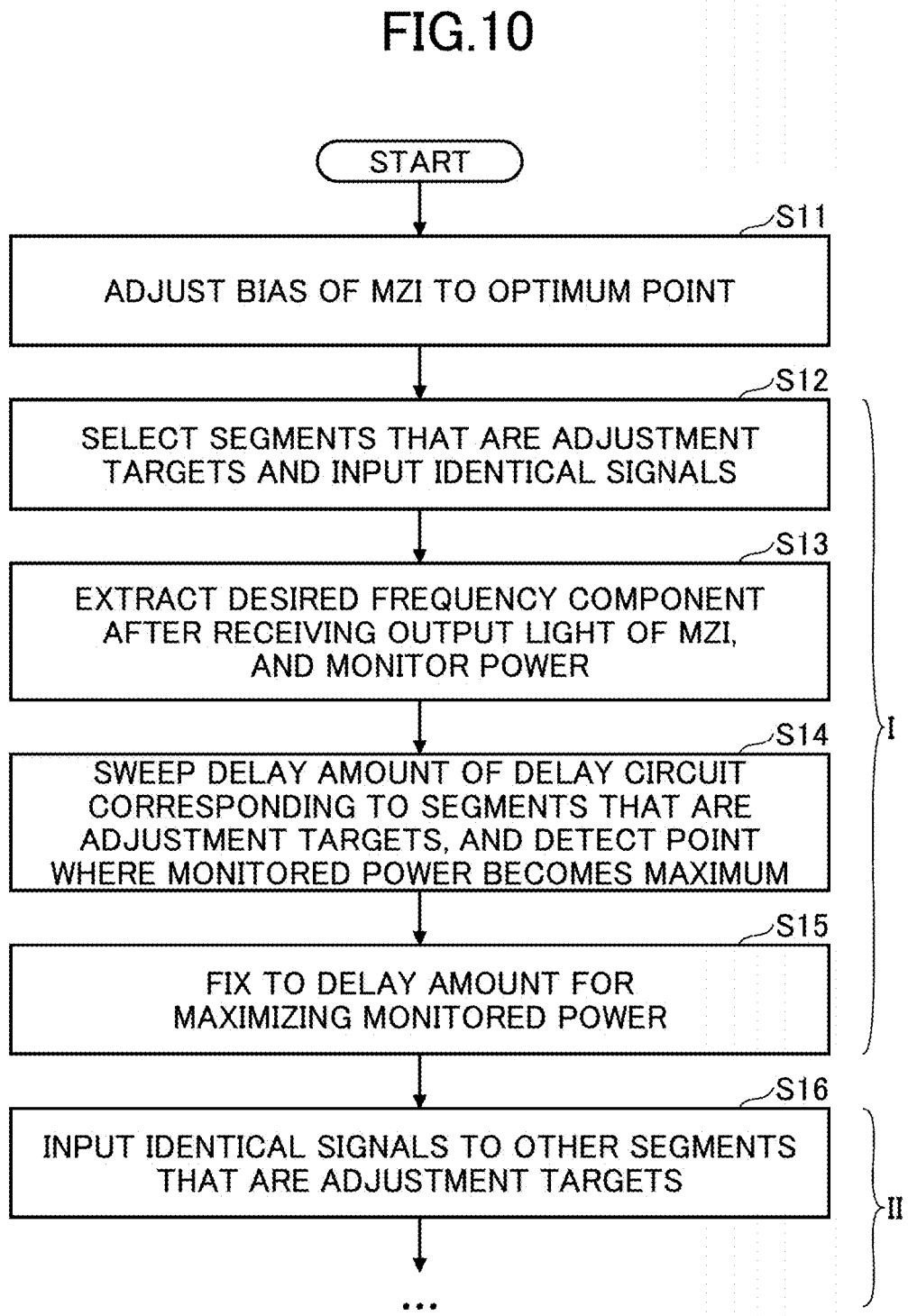

START

S11
ADJUST BIAS OF MZI TO OPTIMUM POINT

S12
SELECT SEGMENTS THAT ARE ADJUSTMENT
TARGETS AND INPUT IDENTICAL SIGNALS

S13
EXTRACT DESIRED FREQUENCY COMPONENT
AFTER RECEIVING OUTPUT LIGHT OF MZI,
AND MONITOR POWER

S14
SWEEP DELAY AMOUNT OF DELAY CIRCUIT
CORRESPONDING TO SEGMENTS THAT ARE
ADJUSTMENT TARGETS, AND DETECT POINT
WHERE MONITORED POWER BECOMES MAXIMUM

I

S15
FIX TO DELAY AMOUNT FOR
MAXIMIZING MONITORED POWER

S16
INPUT IDENTICAL SIGNALS TO OTHER SEGMENTS
THAT ARE ADJUSTMENT TARGETS

II

...

DELAY CONTROL CIRCUIT, OPTICAL TRANSMISSION APPARATUS, AND DELAY CONTROL METHOD

CROSS-REFERENCE TO RELATED APPLICATIONS

This application is based upon and claims the benefit of priority of the prior Japanese Patent Application No. 2023-100050, filed on Jun. 19, 2023, the entire contents of which are incorporated herein by reference.

FIELD

The embodiments discussed herein are related to delay control circuits, optical transmission apparatuses, and delay control methods.

BACKGROUND

Studies are being conducted on a configuration in which a plurality of signal electrodes are provided along one or both of two waveguides forming a Mach-Zehnder (MZ) interferometer (MZI) of an optical modulator, and each electrode is driven independently. The optical modulator having such a configuration may be referred to as "a segment modulator". A capacitance of an element can be reduced, by segmenting (or dividing) a long signal electrode into a plurality of electrodes and individually applying a drive voltage to each of the segmented electrodes. As a result, it is possible to mitigate a trade-off between power consumption and bandwidth of the optical modulator. In the segment modulator, a delay circuit is required to match a timing when light passes through each electrode with a timing when the drive voltage is applied to the electrode. A delay amount mainly assumed up to the present is a propagation delay of an optical signal (for example, on the order of approximately several picoseconds to approximately 100 picoseconds). A control circuit for controlling the timing is implemented by a general circuit having a combination of a phase interpolator circuit and a delay (D) flip-flop circuit. In addition, as a method of monitoring and controlling the delay amount, a proposed configuration controls the timing at which a signal is applied to the plurality of electrodes provided along the waveguide of the optical modulator, according to an average power of output light of the optical modulator (for example, refer to International Publication Pamphlet No. WO 2014/103231).

When a baud rate becomes high in response to a rapid increase in communication traffic in recent years, a delay variation generated in an electronic circuit due to a process variation or a temperature variation can no longer be ignored. An environmental temperature and a local temperature are likely to become different between a factory where an optical transceiver is manufactured and shipped, and an installation site where the optical transceiver is installed and started. In some cases, even when the delay adjustment is completed at the time of shipment, a readjustment may be required at the time of starting the optical transceiver in an operating environment at the installation site. In such cases, it is desirable that the delay circuit, the method of monitoring the delay amount with a high accuracy, and the method of controlling the delay amount are implemented in the optical transceiver.

The present inventors confirmed that a delay of at least 6 picoseconds occurs for a temperature variation from −5° C. to 95° C., by an electronic circuit simulation assuming the drive circuit of the optical modulator and an ideal delay circuit. This delay amount corresponds to $\frac{2}{5}$ of 15.6 picoseconds, which is 1 unit interval (UI) of 64 Gbaud, and $\frac{3}{5}$ of 10.4 picoseconds, which is 1 UI of 96 Gbaud, and is an amount which cannot be ignored as a delay with respect to 1 UI. One object according to an aspect of embodiments of the present disclosure is to provide a delay control technique for automatically controlling a delay amount of a drive signal of an optical modulator having a plurality of electrode segments.

SUMMARY

In one aspect of the embodiments of the present disclosure, a delay control circuit includes a delay circuit configured to provide a predetermined delay to signals input to a plurality of electrode segments provided in series along one or both of two waveguides forming an Mach-Zehnder interferometer of an optical modulator; a control circuit configured to select two electrode segments from the plurality of electrode segments, and control a delay amount between the two electrode segments that are selected; a frequency filter configured to extract a predetermined frequency component from output light of the Mach-Zehnder interferometer, in a state where identical signals that vary at random are input to the two electrode segments; and a monitor configured to monitor a power of the extracted predetermined frequency component, wherein the control circuit controls the delay amount between the two electrode segments based on a monitored result of the extracted predetermined frequency component.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a flow chart of a delay control method according to a first exemplary implementation;

DESCRIPTION OF EMBODIMENTS

Figure 1:
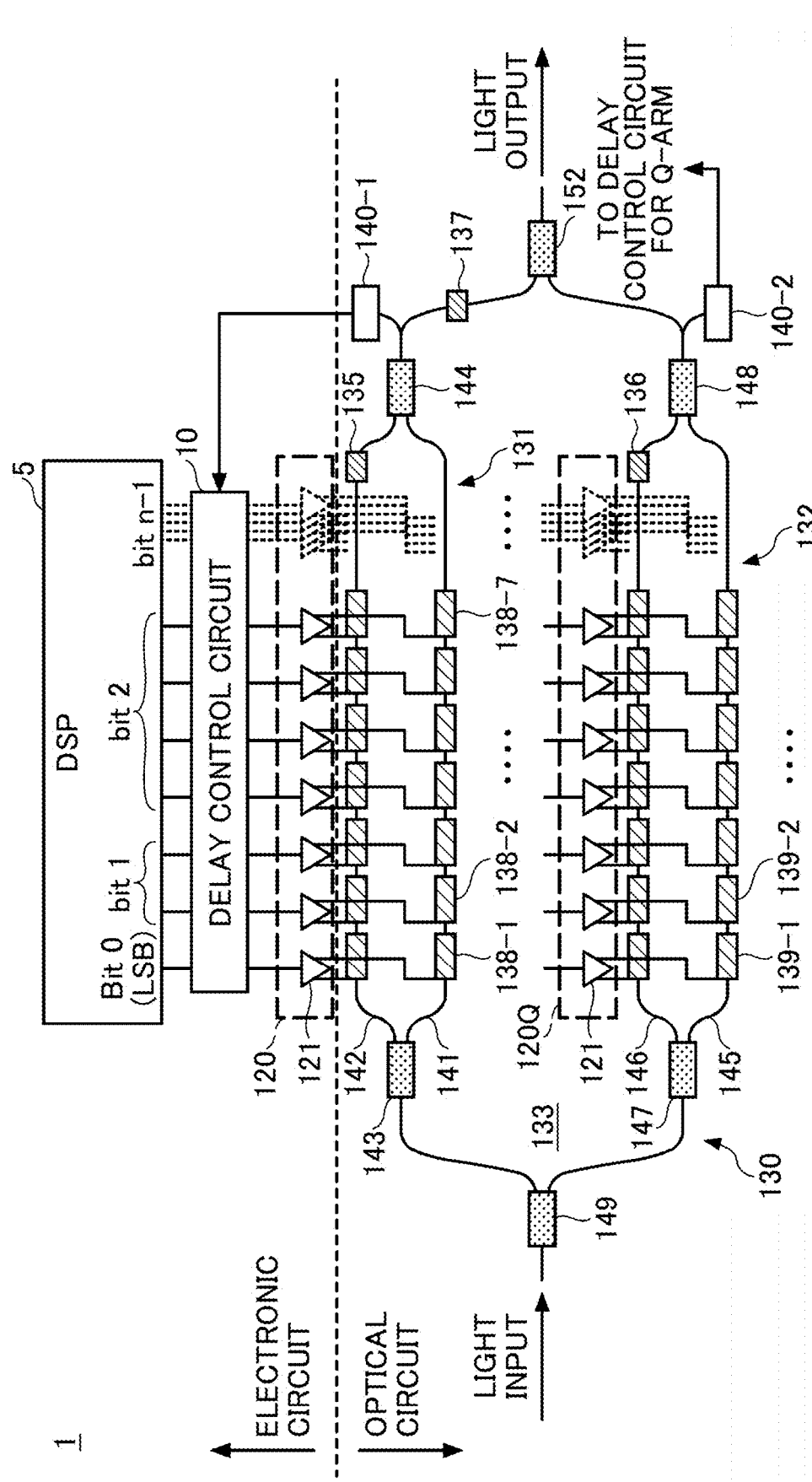
FIG. 1 is a schematic diagram of an optical transmission apparatus according to an embodiment.

In one aspect of the embodiments of the present disclosure, a delay control circuit includes a delay circuit configured to provide a predetermined delay to signals input to a plurality of electrode segments provided in series along one or both of two waveguides forming an Mach-Zehnder interferometer of an optical modulator, a control circuit configured to select two electrode segments from the plurality of electrode segments, and control a delay amount between the two electrode segments that are selected, a frequency filter configured to extract a predetermined frequency component from output light of the Mach-Zehnder interferometer, in a state where identical signals that vary at random (for example, pseudo random binary patterns (PRBPs)) are input to the two electrode segments, and a monitor configured to monitor a power of the extracted predetermined frequency component, wherein the control circuit controls the delay amount between the two electrode segments based on a monitored result of the extracted predetermined frequency component. Hence, a delay amount of a drive signal of the optical modulator (segment modulator) can be controlled automatically with a high accuracy.

Hereinafter, a specific configuration and a delay control method according to embodiments of the present disclosure will be described with reference to the drawings. The following embodiments are examples for embodying a technical concept of the present disclosure, and do not limit contents of the present disclosure. A size, positional relationship, or the like of constituent elements illustrated in the drawings may be exaggerated to facilitate the understanding of the present disclosure. Constituent elements having the same configuration or function are designated by the same names or reference numerals, and a redundant description thereof may be omitted.

<Optical Transmission Apparatus>

FIG. 1 is a schematic diagram of an optical transmission apparatus 1 according to an embodiment. The optical transmission apparatus 1 includes an electronic circuit and an optical circuit, and generates and outputs an optical signal by utilizing an interaction between light and electricity. The optical transmission apparatus 1 includes an optical modulator 130, a driver array 120 that drives the optical modulator 130, a digital signal processor (DSP) 5, and a delay control circuit 10. The DSP 5, the delay control circuit 10, and the driver array 120 are included in the electronic circuit, and the optical modulator 130 is included in the optical circuit. In the description of a configuration example of the present disclosure, an electric digital-to-analog converter (DAC) is omitted, bit signals from the DSP 5 are applied to segmented signal electrodes of the optical modulator 130, and multi-valued in the optical modulator 130, but the utilization of the segment modulator according to the embodiments is not limited to the contents of the present disclosure.

The optical modulator 130 is a so-called nested modulator, and two child Mach-Zehnder modulators (MZM) 131 and 132 are connected in parallel between an optical coupler (branching coupler) 149 and an optical coupler (merging coupler) 152 to form a parent MZM 133. A carrier wave emitted from a light source is branched into two by the optical coupler 149, and the two branched lights are input to the child MZMs 131 and 132, respectively. The lights modulated by the child MZMs 131 and 132 are merged by the optical coupler 152, thereby outputting a modulated optical signal. The optical modulator 130 is an IQ modulator which uses a phase shifter 137 to introduce a phase difference of 90° between the two lights output from the child MZMs 131 and 132, but is not limited to this example. The optical modulator 130 may have a configuration including a single MZM, or a configuration including two parent MZMs 133 connected in parallel. In the example illustrated in FIG. 1, a waveguide portion including the child MZM 131 may be referred to as an I-arm, and a waveguide portion including the child MZM 132 may be referred to as a Q-arm.

The child MZM 131 has two waveguides 141 and 142 connected in parallel between an optical coupler (branching coupler) 143 and an optical coupler (merging coupler) 144, and forms an MZ interferometer (MZI). A plurality of segmented signal electrodes are provided along at least one of the waveguides 141 and 142. For the sake of convenience, each of the segmented signal electrodes will be referred to as "an electrode segment". Electrode segments 138-1, 138-2, . . . , 138-7, . . . (hereinafter also collectively referred to as "electrode segments 138") are provided along the waveguides 141 and 142. A phase shifter 135, which maintains an operating point of the child MZM 131 at an optimum point, is connected in series with the electrode segments 138. The phase shifter 135 is used as a DC bias electrode.

A digital electrical signal representing a logical value of an input signal is input to each of the electrode segments 138. For example, a signal representing the logical value of a bit 0 is input to the electrode segment 138-1, and a signal representing the logical value of a bit 1 is input to the electrode segments 138-2 and 138-3, in an order from a light incident side of the child MZM 131. A signal representing the logical value of the corresponding bit is input to a number of electrode segments 138 corresponding to the number in a bit string, in an order successively thereafter. The signal of a bit (n−1), which is the most significant bit (MSB), is input to 2-1 electrode segments 138. The $2^{n-1}$ electrode segments 138 are provided with respect to n bits (bit 0 to bit (n−1)).

The child MZM 132 has two waveguides 145 and 146 connected in parallel between the optical coupler 147 and the optical coupler 148, and forms an MZ interferometer (MZI). A plurality of electrode segments 139-1, 139-2, . . . (hereinafter also collectively referred to as "electrode segments 139") are provided along at least one of the waveguides 145 and 146. A phase shifter 136, which maintains an operating point of the child MZM 132 at an optimum point, is connected in series with the electrode segments 139. The phase shifter 136 is used as a DC bias electrode. The electrode segments 139 of the child MZM 132 have the same configuration as the electrode segments 138 of the child MZM 131, except that an input signal of the child MZM 132 is different from the input signal of the child MZM 131.

The optical transmission apparatus 1 including the optical modulator (segment modulator) 130 described above can be used for digital coherent transmission and intensity modulation-direct detection (IM-DD) transmission. In the case of the digital coherent transmission, the operating points or bias points of the child MZMs 131 and 132 may be set to the Null point. In the case of the IM-DD transmission, the operating points or bias points of the child MZMs 131 and 132 may be set to the Quad point.

A part of the output light of the child MZM 131 is branched before the optical coupler 152 of the parent MZM 133 and detected by a monitoring photodetector (PD) 140-1, which is an example of a photodetector for monitoring. Similarly, a part of the output light of the child MZM 131 is branched before the optical coupler 152 of the parent MZM 133 and detected by a monitoring PD 140-2, which is an example of a photodetector for monitoring. The output of the monitoring PD 140-1 is supplied to the delay control circuit 10 for the I-arm. The output of the monitoring PD 140-2 is supplied to the delay control circuit for the Q-arm. The monitoring PDs 140-1 and 140-2 may be collectively referred to as "a monitoring PD 140".

In FIG. 1, an illustration of a delay control circuit for the Q-arm is omitted for the sake of simplifying the drawing to facilitate the understanding thereof, but the delay control circuit for the Q-arm is connected between the DSP 5 and the driver array 120Q for the Q-arm with the same connection relationship as the delay control circuit 10 for the I-arm. The driver array 120Q and the delay control circuit for the Q-arm are also included in the electronic circuit. However, bit data input to the delay control circuit for the Q-arm is different from the bit data input to the delay control circuit 10 for the I-arm.

The DSP 5 outputs a digital signal representing the logical value of each bit of the transmission data. The digital signal representing the value of each bit is amplified by a driver 121 of the driver array 120, and input to the corresponding electrode segment or segments 138. The driver 121 is an inverter driver that applies an inverted output and a non-inverted output to the corresponding electrode segment or segments 138 of the two waveguides 141 and 142, for example.

When inputting the digital signal to the corresponding electrode segment or segments 138 provided on the waveguides 141 and 142, it is necessary to match a timing when the incident light passes through portions of the waveguides 141 and 142 directly below the electrode segment or segments 138 with a timing when the signal is input to the electrode segment or segments 138. For this reason, the delay control circuit 10 is inserted between the DSP 5 and the driver array 120, so as to control the timing of the action between the electrode segments 138. The delay amount between the electrode segments 138 is controlled based on the output light of the child MZM 131 that is a delay control target. Similarly, in the child MZM 132, the timing of the input digital electrical signal is adjusted according to a velocity of the light passing through the waveguides 145 and 146, based on the output light of the child MZM 132.

Each electrode segment 138 is centrally driven constantly with the same voltage by each driver 121 of the driver array 120. The digital electrical signal input to the electrode segment or segments 138 provided on the waveguides 141 and 142 of the optical modulator 130, or the digital electrical signal input to the electrode segment or segments 139 provided on the waveguides 145 and 146 of the optical modulator 130, is converted into an analog optical signal by the optical modulator 130. In this sense, the optical transmission apparatus 1 illustrated in FIG. 1 may be referred to as "an optical DAC transmitter".

The delay control circuit 10 according to the embodiment controls a fine delay variation caused by a temperature variation or a process variation at the time of starting the optical DAC transmitter at an installation site, in addition to the delay control during the actual operation of the optical DAC transmitter. In addition, during an inspection before shipment from a factory, for example, it is also possible to adjust a propagation delay of an optical signal or a delay caused by isometric wiring of the electronic circuit. The specific configuration and operation of the delay control circuit 10 for controlling such a delay variation will be described later, with reference to FIG. 3 and the subsequent drawings.

Figure 2A:
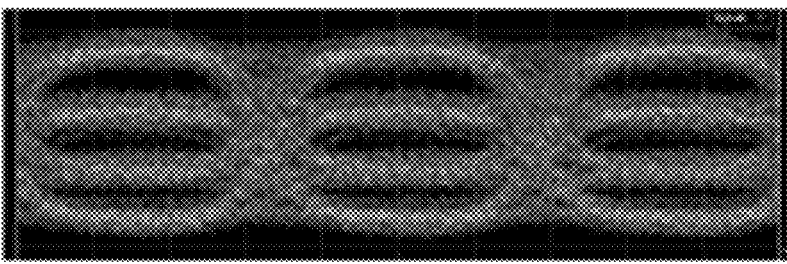
FIG. 2A, FIG. 2B, FIG. 2C, and FIG. 2D are diagrams illustrating examples of waveform deterioration caused by a signal delay at 32 Gbaud.
Figure 2B:
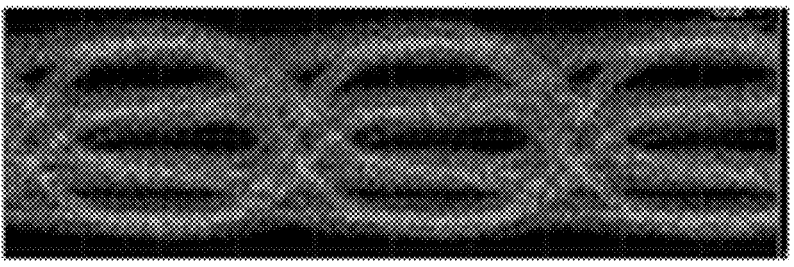
Figure 2C:
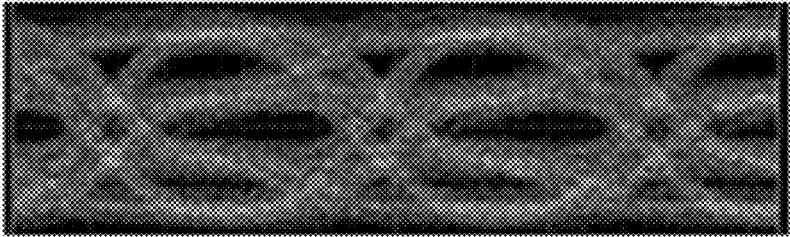
Figure 2D:
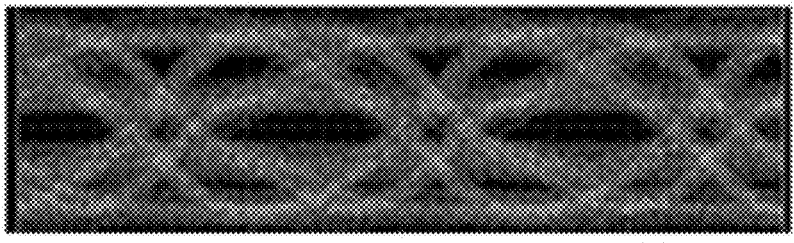

FIG. 2A, FIG. 2B, FIG. 2C, and FIG. 2D are diagrams illustrating examples of waveform deterioration caused by a signal delay at 32 Gbaud. FIG. 2A through FIG. 2D illustrate changes in eye patterns when two bits "bit 0" and "bit 1" are used in signal transmission of pulse amplitude modulation 4 (PAM44) at 32 Gbaud. As illustrated in FIG. 2A, when the delay amount between the electrode segments is correctly adjusted, a substantially uniform eye opening is obtained among the four levels. As illustrated in FIG. 2B, FIG. 2C, and FIG. 2D, when the delay amount from the correct signal input timing increases to 5 picoseconds, 10 picoseconds, and 15 picoseconds, respectively, a rise time of the signal is delayed and the eye opening is deformed, thereby deteriorating a waveform quality.

The delay of 5 picoseconds illustrated in FIG. 2B may occur in the electronic circuit due to the environmental temperature variation or the process variation, even after the delay due to the variation in an interconnection length or the propagation delay of the optical signal is adjusted. When the delay of 5 picoseconds at 32 Gbaud occurs, the eye opening between the eye level 0 and the eye level 1 becomes narrow and causes the eye-opening penalty. When the baud rate increases to 64 Gbaud or 96 Gbaud, the effects of the signal delay of 5 picoseconds on the waveform deterioration increase. By controlling such a fine delay variation by the delay control circuit 10 with a high accuracy, a good signal quality can be maintained regardless of the variation in the manufacturing process or the installation environment.

<Delay Control Circuit>

Figure 3:
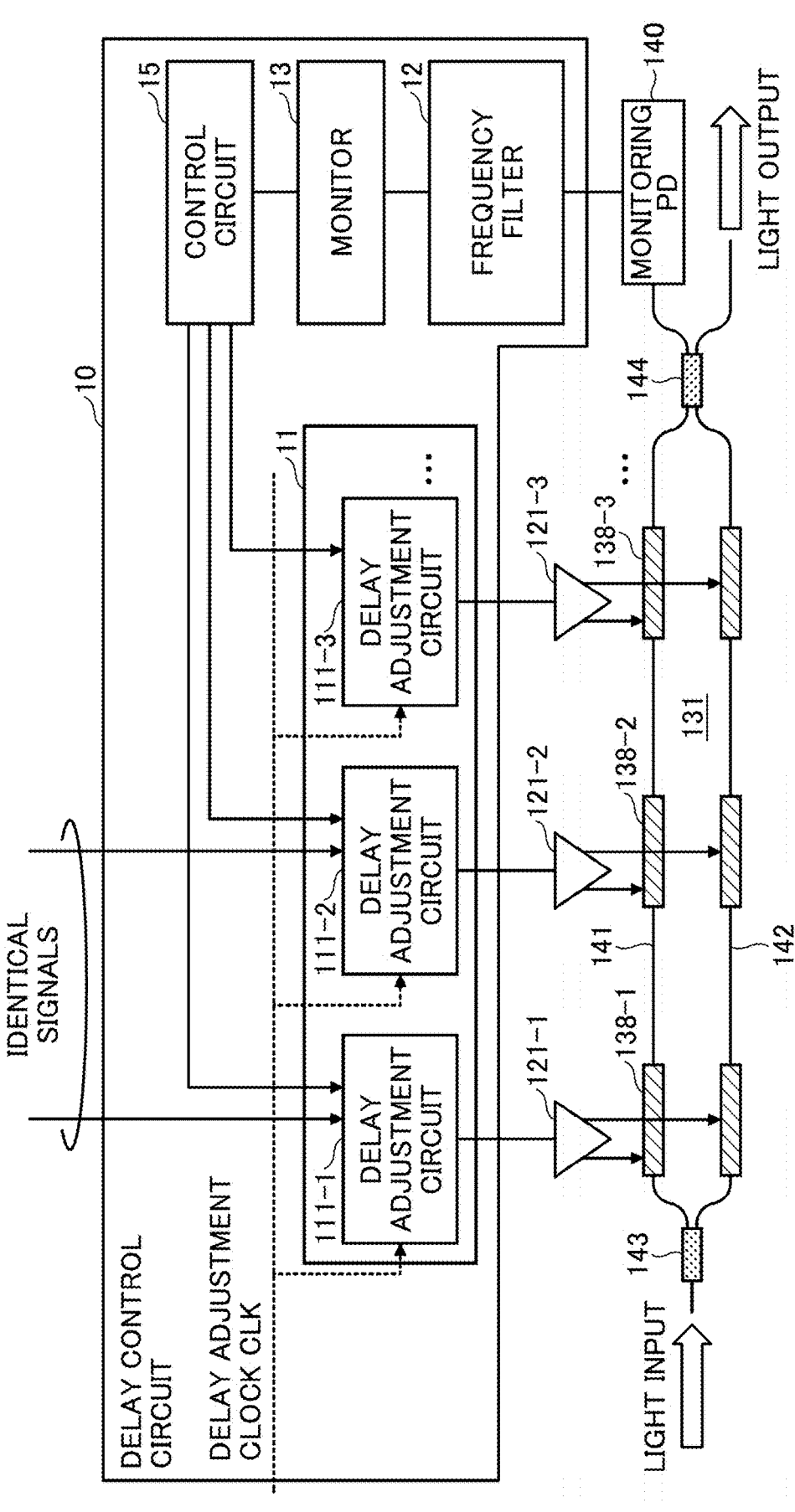
FIG. 3 is a schematic diagram of a delay control circuit according to an embodiment.

FIG. 3 is a schematic diagram of the delay control circuit 10 according to the embodiment. The configuration and operation of the delay control circuit 10 will be described by focusing on a single MZM, that is, the child MZM 131, for example. The operation described with reference to FIG. 3 is performed at the time of the inspection before shipment from the factory, when the optical transmission apparatus 1 is installed in a network and started, when the optical transmission apparatus 1 is restarted for repair or maintenance, or the like.

The delay control circuit 10 includes a delay circuit 11, a control circuit 15 for controlling the delay circuit 11, a frequency filter 12 for extracting a predetermined frequency component from the detection result of the output light of the child MZM 131, and a monitor 13 for monitoring a power of the extracted frequency component. The delay circuit 11 includes delay adjustment circuits 111-1, 111-2, 111-3, . . . (collectively referred to as "delay adjustment circuits 111", as appropriate) that adjust the delay amounts of the signals input to the electrode segments 138-1, 138-2, 138-3, . . . provided along the waveguide 141 or 142 of the child MZM 131. A delay adjustment clock CLK is supplied to each delay adjustment circuit 111 from the DSP 5, for example.

In the adjustment of the delay variation before the actual operation, the control circuit 15 selects two electrode segments from the plurality of electrode segments 138. Identical signals having a continuous spectrum that is sufficiently wide in the frequency domain extracted by the frequency filter 12 are input to the two selected electrode segments 138. In the example illustrated in FIG. 3, the electrode segments 138-1 and 138-2 are selected as the two electrode segments. A random signal that varies at random or a pseudo random binary sequence (PRBS) may be used as the signal having the continuous spectrum that is sufficiently wide in the frequency domain extracted by the frequency filter 12. The identical signals are signals having the same random variation pattern, the same amplitude, and the same phase. The identical signals are input from the DSP 5 to the delay control circuit 10 for the delay adjustment, and are input to the delay adjustment circuits 111-1 and 111-2 for adjusting the delays of the selected electrode segments 138-1 and 138-2. There is no signal input to the electrode segments 138 that are not selected, and the non-selected electrode segments 138 are in an off state.

The identical signals that vary at random are delayed by a predetermined delay amount in the delay adjustment circuits 111-1 and 111-2, in response to the delay adjustment clock CLK. The delayed signals are amplified by the drivers 121-1 and 121-2, and input to the electrode segments 138-1 and 138-2. The child MZM 131 is set at a Quad point, for example, and an inverted signal and a non-inverted signal are input to the electrode segment 138-1 provided on the waveguide 141 and the corresponding electrode segment provided on the waveguide 142, respectively. In such a configuration, the term "electrode segment 138-1" is intended to include both the electrode segment 138-1 provided on the waveguide 141 and the corresponding electrode segment provided on waveguide 142.

The output light of the child MZM 131 becomes a maximum when the timing at which the light passes through the waveguide 141 immediately below the electrode segment 138-1 coincides with the timing at which the signal is input to the electrode segment 138-1, and the timing at which the light passes through the waveguide 141 immediately below the electrode segment 138-2 coincides with the timing at which the signal is input to the electrode segment 138-2.

A part of the output light of the child MZM 131 is detected by the monitoring PD 140 (corresponding to the monitoring PD 140-1 in FIG. 1), and an electrical signal indicating the detection result is input to the frequency filter 12. The filter 12 is an electric filter configured to extract a predetermined frequency component from the detection result of the monitoring PD 140, for example. The monitor 13 monitors the power of the extracted frequency component, and supplies the monitored result to the control circuit 15. Because the signal that varies at random is used as the input signal, the monitor 13 can monitor the power of an arbitrary frequency component extracted from the spectrum that continuously spreads over the extracted frequency domain.

The control circuit 15 sweeps the delay amounts of one of the delay adjustment circuits 111-1 and 111-2, and controls the delay amount so that the power monitored by the monitor 13 becomes a maximum. One of the two delay adjustment circuits 111-1 and 111-2 is used as a reference circuit, and the control circuit 15 sweeps the delay amounts of the other of the two delay adjustment circuits 111-1 and 111-2. A relative delay amount at which the monitored power of the extracted frequency component becomes a maximum, is set in the delay adjustment circuit 111 that is an adjustment target.

When the relative delay amount is adjusted between the two selected electrode segments 138-1 and 138-2, two other electrode segments are newly selected next, such as the electrode segments 138-1 and 138-3 or the electrode segments 138-2 and 138-3, for example. When the relative delay amount is adjusted between the two newly selected electrode segments 138 according to the procedure described above, further two other electrode segments 138 are newly selected next. The relative delay amount between two selected electrode segments 138 is successively adjusted in a similar manner until the delay amount between the electrode segments 138 is adjusted for the entire child MZM 131.

This delay adjustment can also be applied to the inspection before the shipment from the factory, in addition to when starting the optical transmission apparatus 1 at the installation site. Normally, in the inspection before the shipment from the factory, the delay amount of each delay adjustment circuit 111 is adjusted while measuring the eye pattern, but by using the delay control circuit 10 according to the embodiment, the entire delay amount can be automatically controlled including the adjustment of the fine delay variation.

Figure 4:
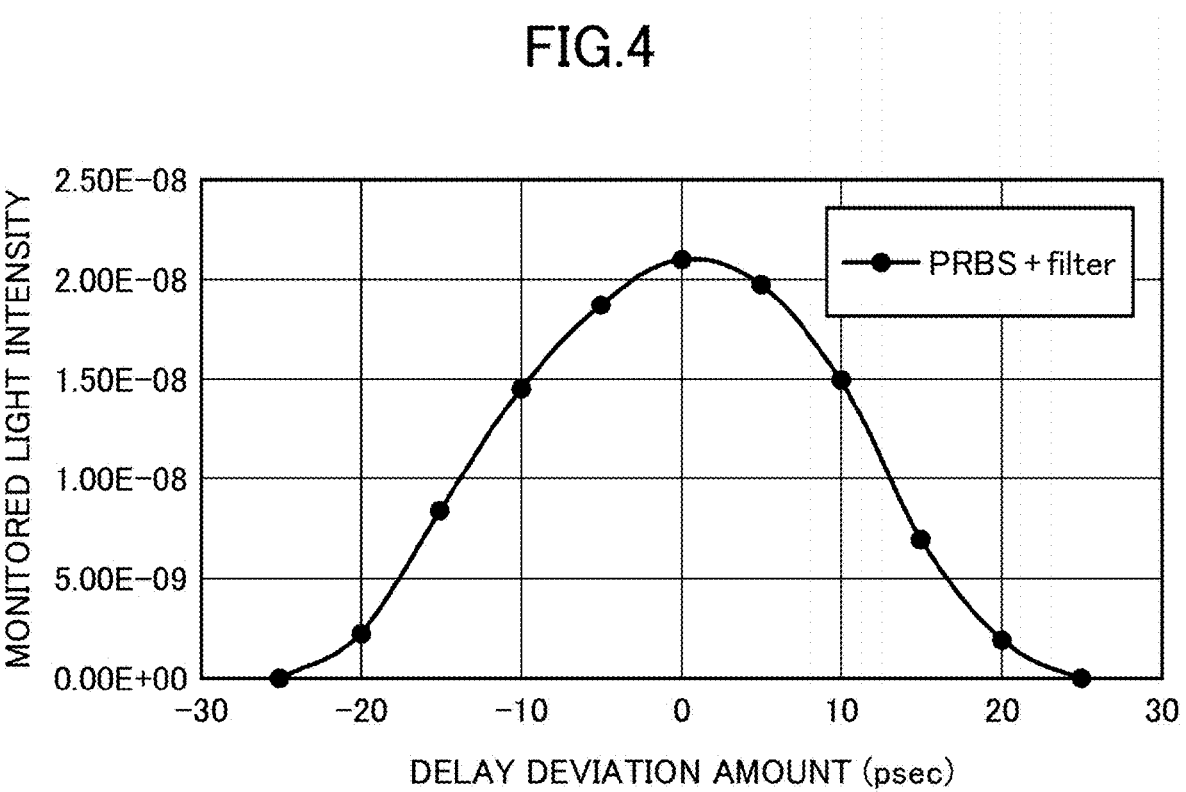
FIG. 4 is a diagram illustrating a relationship between a delay deviation amount and a monitored light intensity.

FIG. 4 illustrates a relationship between a delay deviation amount between the two electrode segments 138 and the monitored light intensity. Pseudo random binary sequences (PRBSs) that are identical are input to the two selected electrode segments 138, and the output light of the child MZM 131 is detected by the monitoring PD 140-1. The frequency filter 12 extracts a frequency component of 20±5 GHz from the output of the monitoring PD 140, and sweeps the delay amounts of the delay adjustment circuit 111 that is the adjustment target in a range of ±25 picoseconds (psec). The output light of the child MZM 131 becomes a maximum when the delay amount is 0 picoseconds, and the output light of the child MZM 131 becomes quenched when the delay amount is 25 picoseconds. By sweeping the delay amounts of the delay adjustment circuit 111 corresponding to the electrode segment 138 that is the adjustment target, and determining the delay amount to a delay amount that maximizes the output light in the extracted frequency domain, a timing deviation between the two selected delay adjustment circuits 111 can be minimized.

Figure 5:
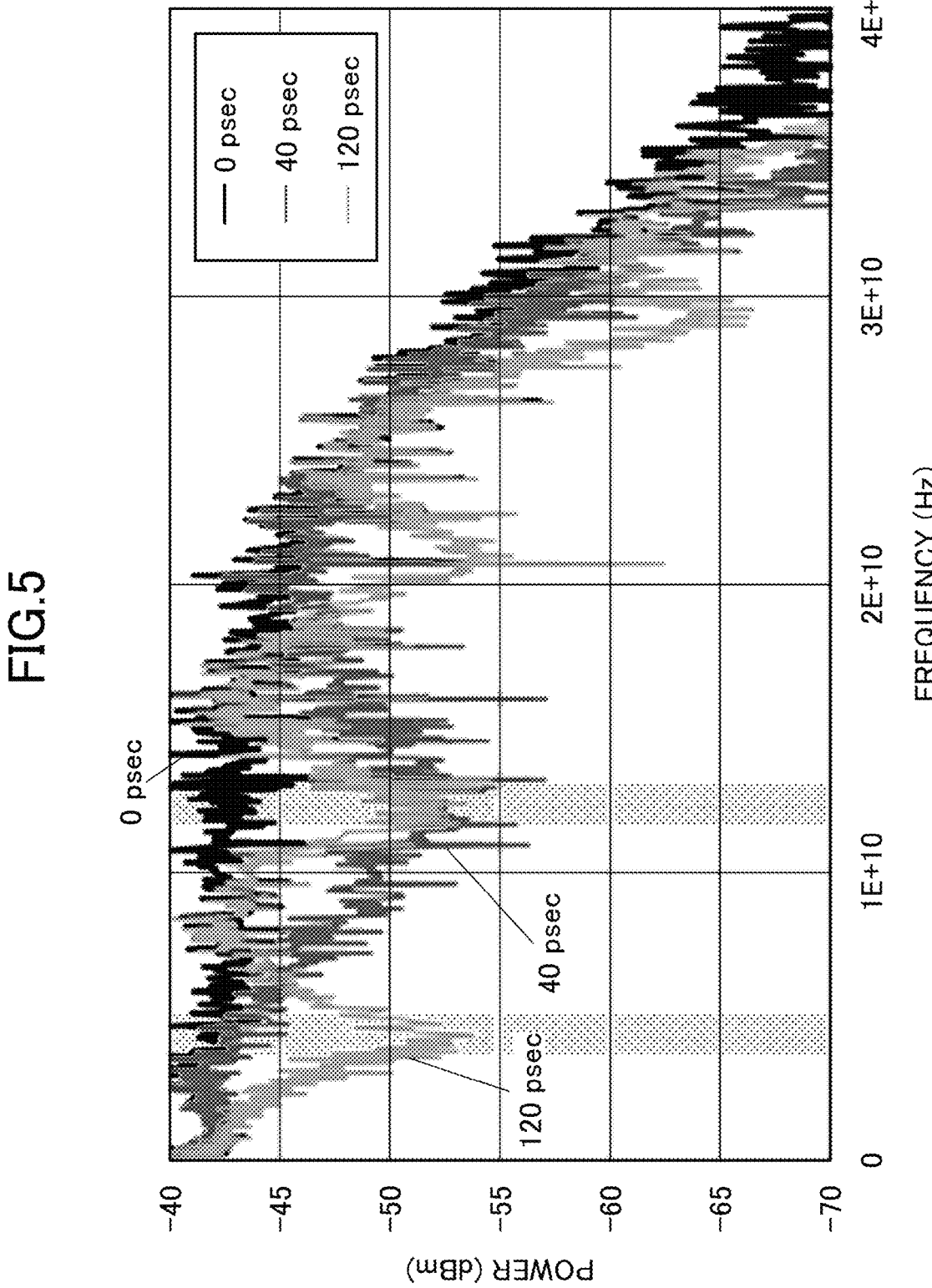
FIG. 5 is a diagram illustrating a significance of using a frequency filter.

FIG. 5 is a diagram illustrating a significance of using the frequency filter 12. FIG. 5 illustrates examples of actual measurements of frequency characteristics of power at different delay amounts when generating a PAM4 waveform using 2-bit data. A darkest line indicates the actual measurement result at a delay amount of 0 picoseconds, a medium intensity line indicates the actual measurement result at a delay amount of 40 picoseconds, and a lightest line indicates the actual measurement result at a delay amount of 120 picoseconds. In FIG. 5, the abscissa represents the frequency (Hz), and the ordinate represents the monitored power (dBm). When the delay amount is 0 picoseconds (NRZ), the monitored power is substantially constant up to a certain frequency (20 GHz, for example), and the monitored power decreases when the certain frequency (20 GHz, for example) is exceeded.

In contrast, when the delay amount is 40 picoseconds or 120 picoseconds, the power is quenched at constant frequency intervals according to the delay amount. That is, it may be seen that the frequency at which the power quenches varies depending on the delay amount between the electrode segments. In the example illustrated in FIG. 5, the power monitored near 4 GHz decreases when the delay amount is 120 picoseconds, and the power monitored near 12 GHz decreases when the delay amount is 40 picoseconds, as indicated by regions with half-tone dot meshing in FIG. 5. Accordingly, by extracting the frequency components near 4 GHz, near 12 GHz, near 20 GHz, or the like and monitoring the power, a steep change in power can be extracted according to the delay amount, and a fine delay difference can be detected with a high accuracy.

Figures 6, 7:
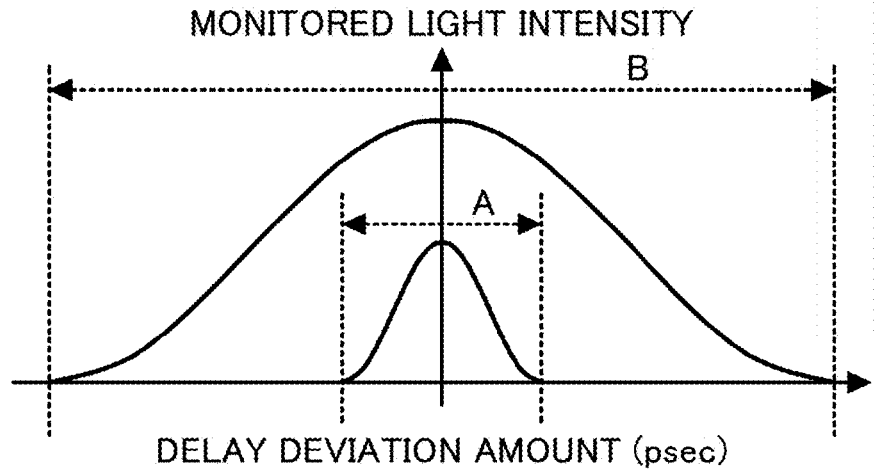
FIG. 6 is a diagram illustrating a center frequency and a delay adjustment range of the frequency filter.
FIG. 7 is a conceptual diagram illustrating an adjustment range of the delay deviation amount according to the frequency.

FIG. 6 illustrates a relationship between a center frequency of the frequency filter 12 (also referred to as "a filter center frequency") and a delay adjustment range. As described above, the frequency filter 12 is an electric band-pass filter, for example, and can arbitrarily select a frequency component to be extracted. In this state, when a timing deviation amount (delay amount) is denoted by τ, a relationship between the frequency component eliminated due to the timing deviation and the delay amount can be expressed by ½τ. Accordingly, when the filter center frequency is 5 GHz, the delay amount can be adjusted in a range of ±100 picoseconds. When the filter center frequency increases to 10 GHz, 20 GHz, 50 GHz, and 100 GHz, the delay adjustment range is narrowed to ±50 picoseconds, ±25 picoseconds, ±10 picoseconds, and ±5 picoseconds, respectively.

FIG. 7 illustrates a relationship of the adjustment ranges of a delay deviation amount according to the frequency. In a case where the filter center frequency is low, the delay deviation amount can be controlled over a wide range as indicated by a range B. When the filter center frequency becomes high, the control range of the delay deviation amount becomes narrow, as indicated by a range A, but a fine delay deviation can be adjusted with a high accuracy. The center frequency of the frequency filter 12 may be set low, so as to adjust a relatively large delay amount caused by the isometric wiring and the propagation delay in the electronic circuit, and thereafter set the center frequency of the frequency filter 12 high, so as to adjust a fine delay variation caused by the temperature variation or the process variation. For example, the center frequency of the frequency filter 12 may be set to approximately 5 GHz to approximately 10 GHz at the time of shipment from the factory, so as to adjust the propagation delay or the delay caused by the variation in the interconnection length, and the filter center frequency may be set to a higher frequency, so as to perform the fine delay adjustment when starting the optical transmission apparatus 1 at the installation site.

Figure 8A:
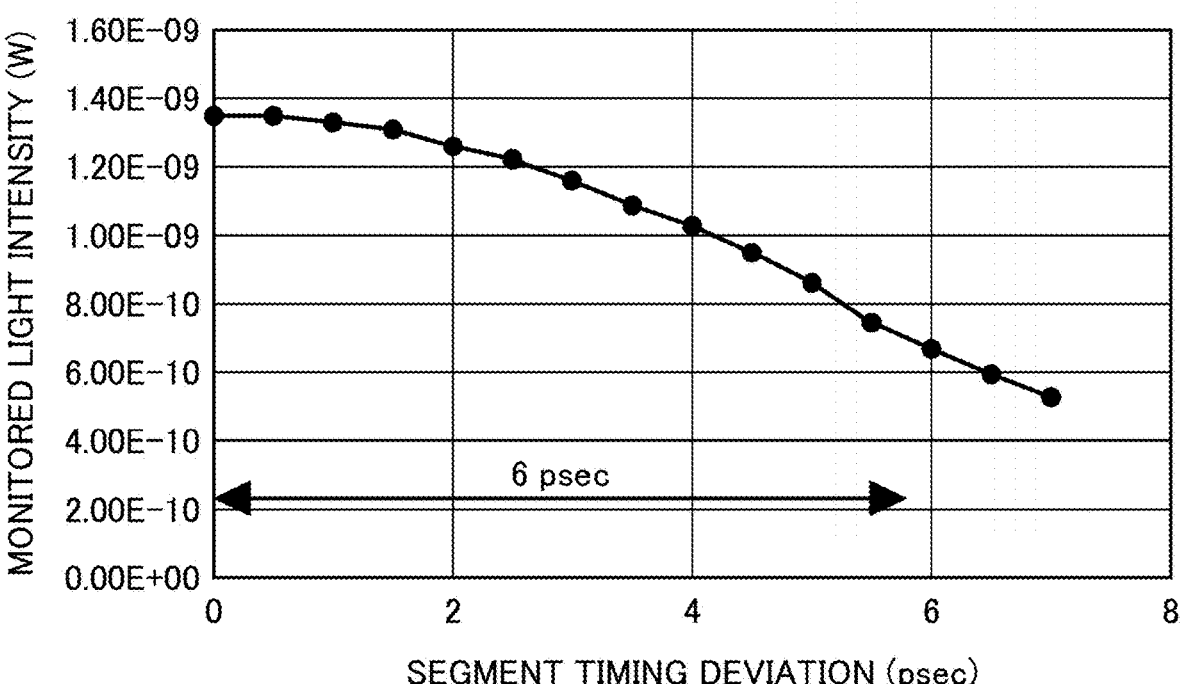
FIG. 8A and FIG. 8B are diagrams illustrating a delay amount dependence of monitored light intensities at filter center frequencies of 50 GHz and 96 GHz, respectively.
Figure 8B:
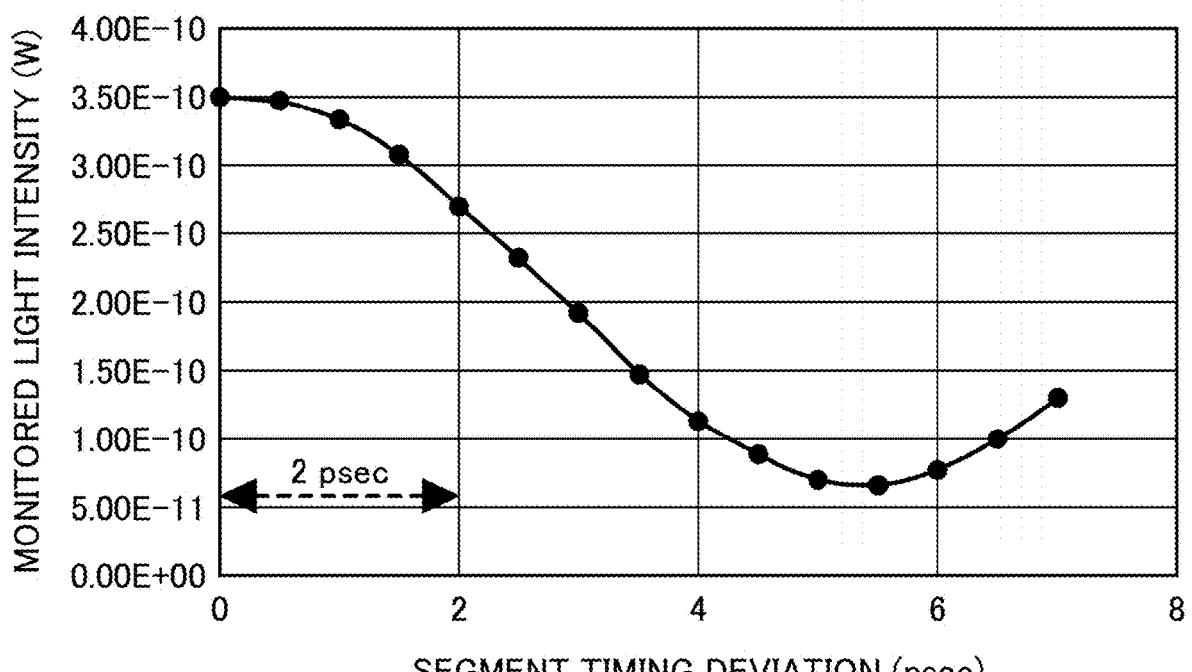

FIG. 8A and FIG. 8B are diagrams illustrating a delay amount dependence of monitored light intensities at filter center frequencies of 50 GHz (±5 GHz) and 96 GHz (±5 GHz), respectively. The delay amount dependence of each of FIG. 8A and FIG. 8B is an example corresponding to a case where the control range of the delay deviation amount is narrow as indicated by the range A in FIG. 7. In FIG. 8A, when the center frequency of the frequency filter 12 is set to 50±5 GHz, and the timing deviation between the electrode segments 138 increases from 0 picoseconds to 7 picoseconds, the power (monitored intensity) measured by the monitor 13 exhibits a simple decrease. In particular, the monitored intensity varies with a sufficient gradient. When an ideal power monitor with a high resolution is used, even a slight variation in the monitored intensity due to the fine delay of 0.5 picoseconds or less can be detected.

In FIG. 8B, when the center frequency of the frequency filter 12 is set to 96±5 GHz, the timing deviation between the electrode segments 138 increases, the monitored intensity decreases with a larger gradient than in the case of FIG. 8A, and the monitored intensity quenches in approximately 5.2 picoseconds. In particular, the gradient of the variation in the monitored intensity is large in the range of 0.5 picoseconds to 5 picoseconds, and the fine delay amount can be detected with a high accuracy. The center frequency of the frequency filter 12 may be set to 50 GHz or lower, for example, in a region where the delay variation amount of the adjustment target is large, and the center frequency of the frequency filter 12 may be set higher than 50 GHz, for example, in a region where the delay variation amount of the adjustment target is small. In this case, it is possible to perform a flexible delay control according to the cause of the timing deviation.

Figure 9A:
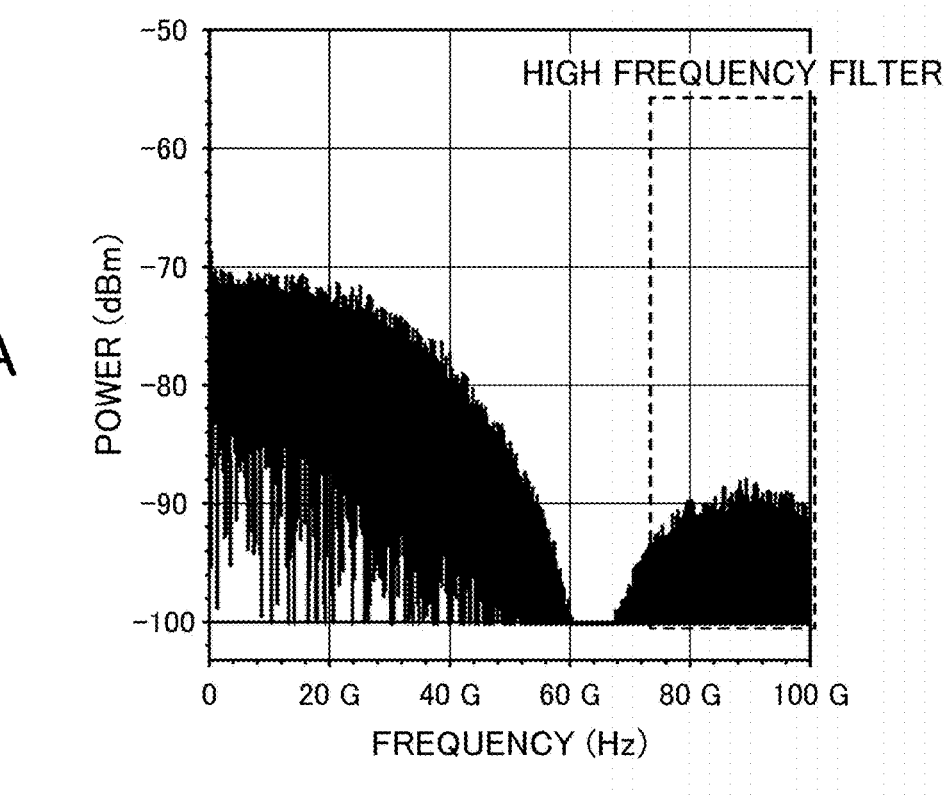
FIG. 9A and FIG. 9B are diagrams illustrating the delay amount dependence of frequency spectrums at the filter center frequency of 96 GHz.
Figure 9B:
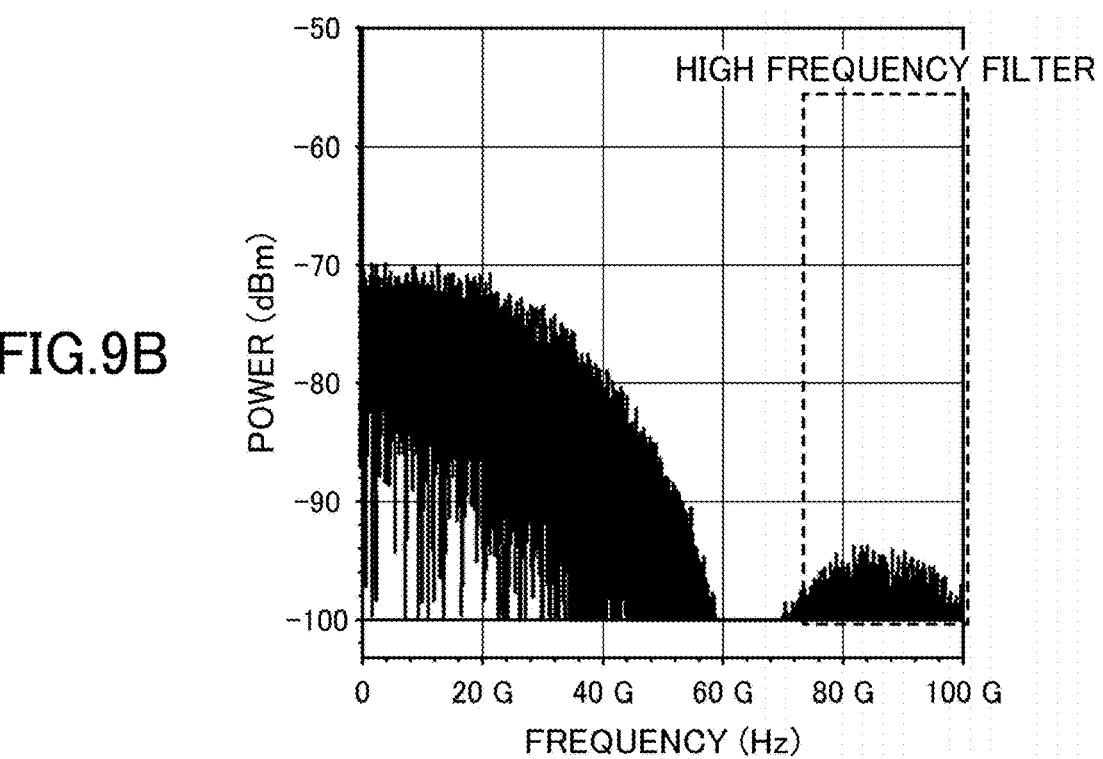

FIG. 9A and FIG. 9B are diagrams illustrating the delay amount dependence of the frequency spectrum when the center frequency of the frequency filter 12 is set to 96±5 GHz, that is, when the frequency spectrum corresponds to the case illustrated in FIG. 8B. When there is no delay difference, that is, no timing deviation between the electrode segments 138 selected for the delay adjustment, the electronic frequency spectrum of the monitor output becomes as illustrated in FIG. 9A. In contrast, when there is a delay difference of 5 picoseconds between the electrode segments 138 selected for delay adjustment, it may be seen that the power of the frequency response in the high frequency domain greatly decreases due to the effects of the high frequency filter. Accordingly, the phenomenon of the monitored light intensity illustrated in FIG. 8B due to the timing deviation between the electrode segments 138 selected for the delay adjustment is observed.

As described above, as an effect obtainable according to the present disclosure, the range of the delay amount to be monitored can be varied from the order of 100 picoseconds to the order of subpicoseconds, by adjusting the center frequency of the frequency filter 12. That is, the present disclosure also contributes to improving the accuracy of delay control. For example, International Publication Pamphlet No. WO 2014/103231 describes that the optical power intensity depends on the baud rate. When a baud rate of 64 Gbaud is taken into consideration, 1 UI is 15.625 picoseconds, and there is substantially no difference in the optical power intensity in a graph of the optical power intensity and the delay time, thereby making it is difficult to detect a variation on the order of approximately 2 picoseconds. On the other hand, in the present disclosure, the high frequency domain to be monitored is narrowed down using the frequency filter 12, and thus, it is possible to accurately detect a timing deviation of 0.5 picoseconds to 2 picoseconds. The delay control circuit 10 according to the present embodiment can obtain significant advantageous effects from a viewpoint of the delay adjustment range and the accuracy of the delay adjustment, when compared to International Publication Pamphlet No. WO 2014/103231.

The delay control circuit 10 according to the embodiment can detect a delay of 0.5 picoseconds to 100 picoseconds regardless of the baud rate, by setting the extraction frequency band of the frequency filter 12 in a GHz domain. This delay adjustment can be applied to the delay adjustment at the time of the shipment from the factory, and also at the time of finely adjusting the delay variation amount when starting the optical transmission apparatus 1 at the installation site.

<Delay Control Method>

FIG. 10 is a flow chart of a delay control method according to a first exemplary implementation, including steps or processes S11 to S16. Main parts of the delay control is performed by the delay control circuit 10. In the first exemplary implementation, the delay control is performed so that the power of the electronic frequency spectrum monitored by the monitor 13 of the delay control circuit 10 becomes a maximum.

First, a bias of the MZ interferometer (MZI) is adjusted to an optimum point (S11). The bias adjustment is performed by an automatic bias control (ABC) circuit provided in the optical transmission apparatus 1, for example. The ABC circuit may be implemented by a logic device such as a field programmable gate array (FPGA), or a microprocessor. In a case where the optical modulator 130 is used in the optical transmission apparatus 1 for IM-DD, the bias may be set to the Quad point. In a case where the optical modulator 130 is used in the optical transmission apparatus 1 for digital coherency, the bias may be set to a Null point. The delay control is performed in a state where the bias is optimally set.

The control circuit 15 of the delay control circuit 10 selects two electrode segments that are the adjustment targets, that is, the electrode segments 138-1 and 138-2, for example, from among the plurality of electrode segments 138 provided along the waveguide of the MZ interferometer (MZI). Identical signals that vary at random are input to selected electrode segments 138-1 and 138-2 (S12). The non-selected electrode segments 138 are turned off, and no signals are input to the non-selected electrode segments 138. The monitoring PD 140 receives the output light of the MZ interferometer (MZI), and extracts a desired frequency component from the electrical signal representing the output of the monitoring PD 140, so as to monitor the power (S13).

The control circuit 15 sweeps the delay amounts of the delay adjustment circuit 111 corresponding to the electrode segments 138 that are the adjustment targets, and detects the delay amount at which the power monitored by the monitor 13 becomes a maximum (S14). One of the two selected electrode segments 138 is used as a reference electrode segment, and the delay amounts of the delay adjustment circuit 111 for adjusting the delay of the other of the two selected electrode segments 138 are swept, so as to perform a relative adjustment of the delay amount between the two selected electrode segments 138. When a maximum point of the power is detected, the delay adjustment circuit 111 of the electrode segments 138 that are the adjustment targets is fixed to the delay amount for maximizing the monitored power (S15). At this stage, a relative delay adjustment process I between the two currently selected electrode segments 138 is completed.

Next, two other electrode segments 138 are selected, and a relative delay adjustment process II is performed by the same procedure as the relative delay adjustment process I. That is, two other electrode segments 138 that are adjustment targets, that is, the electrode segments 138-2 and 138-3, for example, are selected, and identical signals that vary at random are input to the selected electrode segments 138 (S16). Thereafter, the steps S13 to S15 of the delay adjustment process I are repeated, to perform the relative adjustment of the delay amount between the two electrode segments 138. The relative delay amount is adjusted by successively selecting different pairs of electrode segments 138. When the relative delay amounts are controlled for all the pairs of electrode segments 138 to be selected, the delay adjustment of the entire MZ interferometer is completed.

Figure 11:
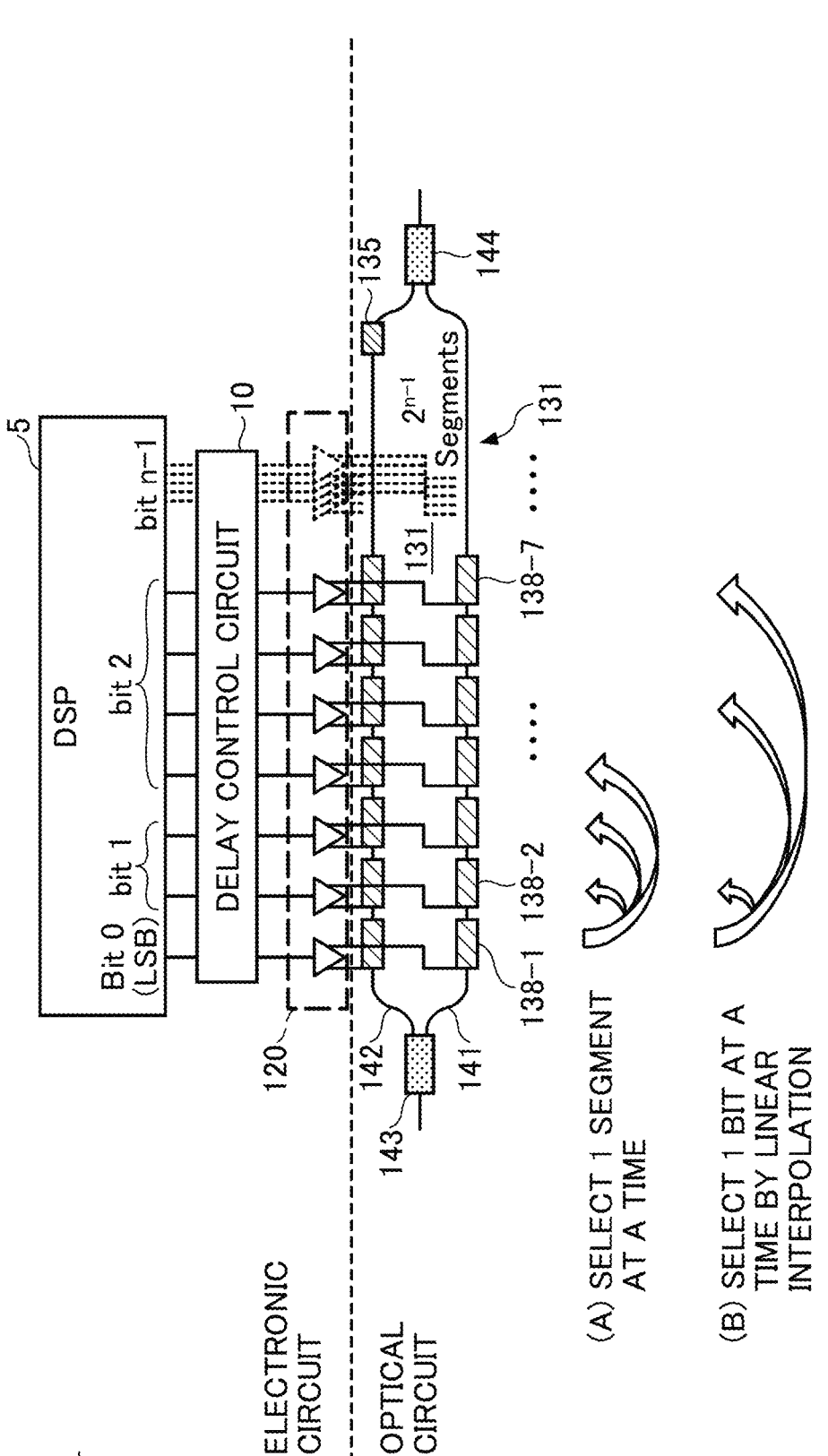
FIG. 11 is a diagram illustrating a selection of two electrode segments that are delay adjustment targets.

FIG. 11 is a diagram illustrating the selection of two electrode segments 138 that are delay adjustment targets. As illustrated by a selection method (A) in FIG. 11, one electrode segment (for example, the electrode segment 138-1) may be fixed as a reference electrode segment, and this reference electrode segment and another electrode segment 138 may be successively selected.

As illustrated by a selection method (B) in FIG. 11, one electrode segment (for example, the electrode segment 138-1) may be fixed as the reference electrode segment, and one electrode segment 138 may be selected from an electrode segment group to which another bit data is input, so as to form an electrode segment pair. For example, the electrode segment 138-1 to which the data of bit 0 is input is regarded as the reference electrode segment, and one of the electrode segments 138-2 and 138-3 to which the data of bit 1 is input is selected, so as to form an electrode segment pair. Next, the electrode segment 138-1 is regarded as the reference electrode segment, and one of the four electrode segments 138-3 through 138-7 to which data of bit 2 is input is selected, so as to form an electrode segment pair. The delay amount of the electrode segments that are not selected from the same electrode segment group can be interpolated by linear interpolation, for example. The selection method (B) in FIG. 11 is valid only when the relationship between the delay amounts of the electrode segments is linear.

As still another selection method, the electrode segment pair may be selected by successively shifting the reference electrode segment itself. After the delay adjustment is performed between the electrode segments 138-1 and 138-2, the electrode segments 138-2 and 138-3 may be selected, and the electrode segment pairs may be successively shifted by one electrode segment at a time. In any one of the selection methods, the relative delay amount between two electrode segments is determined in the extracted frequency domain, and thus, the signal input timing of the entire MZ interferometer (MZI) can be correctly adjusted.

When the MZ interferometer (MZI) to be subject to the delay control is the MZM of the I-arm of the IQ optical modulator, the same delay adjustment process is performed on the MZ interferometer (MZI) forming the MZM of the Q-arm. The delay adjustment of the MZM of the Q-arm is performed by a delay control circuit provided for the Q-arm. The delay adjustment of the I-arm and the Q-arm may be performed simultaneously using identical random signals, or may be performed alternately in time division.

Figure 12:
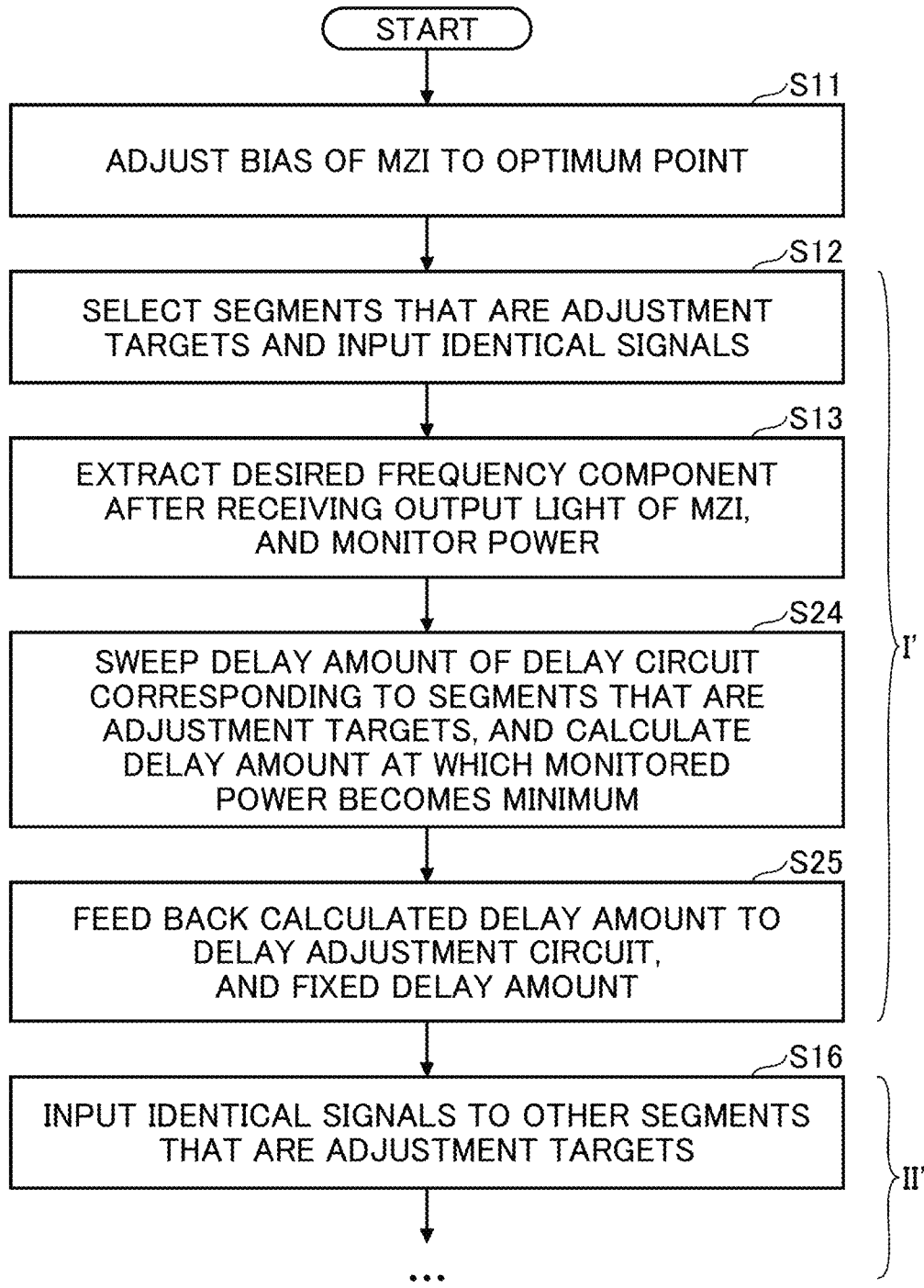
FIG. 12 is a flow chart of the delay control method according to a second exemplary implementation.

FIG. 12 is a flow chart of the delay control method according to a second exemplary implementation, including steps or processes S11 to S13, steps or processes S24 and S25, and step or process S16. In the second exemplary implementation, the delay amount is determined using an attenuation of the frequency component caused by the timing deviation. Steps S11 to S13 are the same as those in the method according to the first exemplary implementation. The bias of the MZ interferometer (MZI) is adjusted to the optimum point (S11), and delay adjustment is performed. Two electrode segments that are the adjustment targets are selected from the plurality of electrode segments 138 provided along the waveguide of the MZ interferometer (MZI), and identical signals that vary at random are input to the two selected electrode segments (S12). The monitoring PD 140 receives the output light of the MZ interferometer (MZI), and the desired frequency component is extracted from the electrical signal representing the output of the monitoring PD 140 so as to monitor the power (S13).

The control circuit 15 sweeps the delay amounts of the delay adjustment circuit 111 corresponding to the electrode segments 138 that are the adjustment targets, and calculates the delay amount at which the monitored power becomes a minimum in the extracted frequency domain (S24). When the timing deviation amount (delay amount) is denoted by $\tau$, the relationship between the frequency component eliminated due to the timing deviation and the delay amount can be expressed by $1/2\tau$. Accordingly, the delay amount at which the power quenches is known in advance from the filter center frequency set by the frequency filter 12. The frequency filter 12 may be set to extract an arbitrary frequency component, and a power quench point of the extracted arbitrary frequency component may be monitored, to add a delay amount corresponding to the power quench point. The delay amount corresponding to when the monitored power becomes the minimum is fed back to the delay adjustment circuit 111, so as to set this delay amount (S25). At this stage, a relative delay adjustment process I' between the two currently selected electrode segments 138 is completed.

Next, two other electrode segments 138 are selected, and a relative delay adjustment process II is performed according to the same procedure as the delay adjustment process I'. The two other electrode segments that are the adjustment targets, that is, the electrode segments 138-2 and 138-3, for example, are selected, and identical signals that vary at random are input to the two selected electrode segments 138 (S16). Thereafter, steps S13, S24, and S25 of the delay adjustment process I' are repeated, so as to perform the relative adjustment of the delay amount between the two electrode segments 138. The relative delay amount is adjusted by successively selecting different pairs of electrode segments 138. When the relative delay amounts are controlled for all of the pairs of electrode segments 138 to be selected, the delay adjustment of the entire MZ interferometer (MZI) is completed.

The method according to the first exemplary implementation and the method according to the second exemplary implementation may be selectively used according to the purpose of delay adjustment. For example, in the delay adjustment at the time of shipment from the factory, the method according to the first exemplary implementation may be used to adjust the delay caused by the variation in the interconnect length and the propagation delay of the optical signal, in order to match the timing of optical propagation and the timing of the signal input. When the optical transmission apparatus 1 is started or restarted at the installation site, the fine delay variation caused by the temperature variation or the environmental variation may be adjusted using the method according to the second exemplary implementation. In the case where the baud rate is high, a delay deviation on the order of several picoseconds may affect the signal waveform, and thus, by accurately adjusting the delay using the method according to the second exemplary implementation, the timing of signal input to the electrode segments can be automatically controlled with a high accuracy.

Modification

Figure 13:
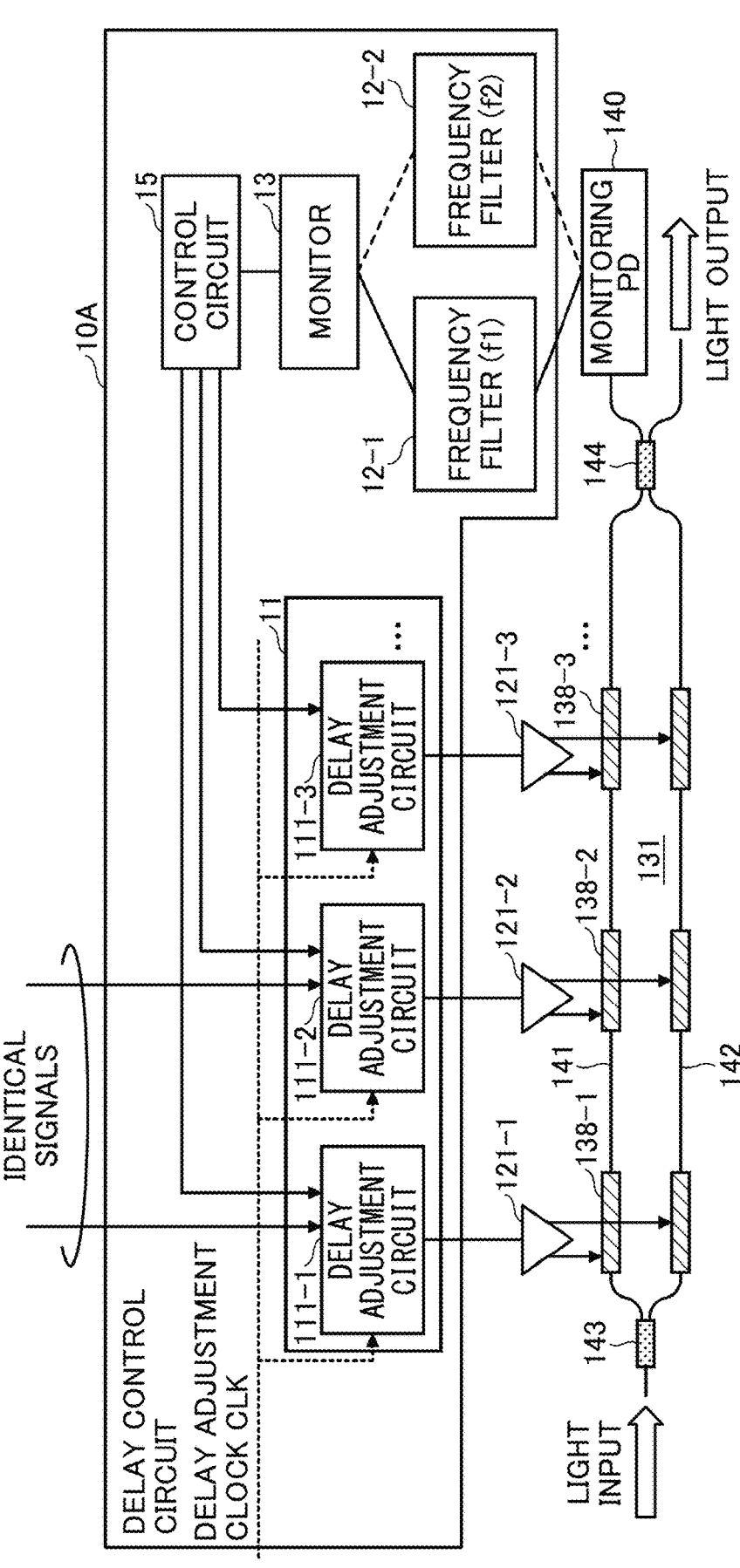
FIG. 13 is a diagram illustrating a modification of the delay control circuit.

FIG. 13 is a schematic diagram of a delay control circuit 10A which is a modification of the delay control circuit 10. The delay control circuit 10A has two kinds of frequency filters 12-1 and 12-2. The frequency filters 12-1 and 12-2 are switchably connected between the monitoring PD 140 and the monitor 13 of the delay control circuit 10A. The frequency filters 12-1 and 12-2 extract mutually different frequency components. A frequency component (or a frequency f1 of the frequency component) extracted by the frequency filter 12-1 is in a frequency band lower than that of a frequency component (or a frequency f2 of the frequency component) extracted by the frequency filter 12-2. The low frequency component f1 is extracted by the frequency filter 12-1, so as to detect the delay deviation amount over a wide range. The high frequency component f2 is extracted by the frequency filter 12-2, so as to detect the delay deviation amount with a high accuracy in a narrow range.

Figure 14:
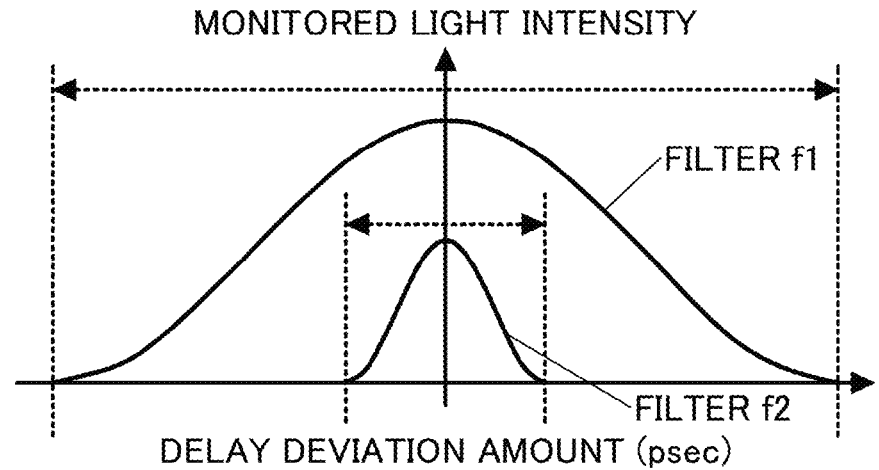
FIG. 14 is a conceptual diagram illustrating the center frequency and the delay adjustment range of the frequency filters.

FIG. 14 illustrates a relationship between the center frequencies of the frequency filters 12-1 and 12-2 and the delay adjustment ranges. For example, after the frequency filter 12-1 roughly adjusts the delay deviation in the wide range, the frequency filter 12-1 may be switched to the frequency filter 12-2 to adjust a fine delay deviation on the order of 2 picoseconds or less with a high accuracy. Instead of the configuration using the two frequency filters 12-1 and

12-2, a single frequency variable filter may be used. In this case, the frequency to be extracted can be varied according to the purpose or mode of the delay control. The configuration of the delay control circuit 10A, other than the configuration described above, may be the same as that of the delay control circuit 10, and a redundant description thereof will be omitted.

Although the delay control circuit and the optical transmission apparatus are described above based on specific configuration examples, the present disclosure is not limited to the configurations described above. In the embodiment, an electric bandpass filter or an electric filter having a variable center frequency and a variable frequency range is used as a means for extracting a predetermined frequency component, but the use of an optical filter in the embodiment is not excluded. An optical filter may be provided at an output stage of the optical modulator 130, and the filtered light may be detected by the monitoring PD 140. In a case where the optical modulator 130 is configured using a silicon photonics technology, the optical filter may be integrated on the same substrate as the optical modulator 130. Identical signals input to the selected electrode segments when performing the delay adjustment may be a random training sequence generated by the DSP 5. Alternatively, the control circuit 15 of the delay control circuit 10 may be configured to store a random pattern for the delay adjustment, and input the random pattern to the delay adjustment circuit corresponding to the selected electrode segments.

According to embodiments and exemplary implementations of the present disclosure, it is possible to provide a delay control technique for automatically controlling a delay amount of a drive signal of an optical modulator having a plurality of electrode segments.

Although the exemplary implementations are numbered with, for example, "first," or "second," the ordinal numbers do not imply priorities of the exemplary implementations. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A delay control circuit comprising:
a delay circuit configured to provide a predetermined delay to signals input to a plurality of electrode segments provided in series along one or both of two waveguides forming a Mach-Zehnder interferometer of an optical modulator;
a control circuit configured to select two electrode segments from the plurality of electrode segments, and control a delay amount between the two electrode segments that are selected;
a frequency filter configured to extract a predetermined frequency component from output light of the Mach-Zehnder interferometer, in a state where identical signals that vary at random are input to the two electrode segments; and a monitor configured to monitor a power of the extracted predetermined frequency component, wherein the control circuit controls the delay amount between the two electrode segments based on a monitored result of the extracted predetermined frequency component.

2. The delay control circuit as claimed in claim 1, wherein control circuit sweeps delay amounts provided to the identical signals input to the two electrode segments by the delay circuit, and sets a delay amount that maximizes the power of the extracted predetermined frequency component in the delay circuit.

3. The delay control circuit as claimed in claim 1, wherein the control circuit sweeps delay amounts provided to the identical signals input to the two electrode segments by the delay circuit, and sets a delay amount corresponding to a frequency at which the power is minimized among the extracted predetermined frequency component in the delay circuit as a relative delay amount between the two electrode segments.

4. The delay control circuit as claimed in claim 1, further comprising:

a photodetector configured to detect the output light of the Mach-Zehnder interferometer, wherein the frequency filter is an electric filter configured to extract the predetermined frequency component from an electrical signal indicating a detection result of the photodetector.

5. The delay control circuit as claimed in claim 4, wherein the frequency filter includes a plurality of frequency filters having mutually different center frequencies and mutually different frequency ranges.

6. The delay control circuit as claimed in claim 4, wherein the frequency filter is a variable filter having a variable center frequency and a variable frequency range.

7. The delay control circuit as claimed in claim 1, wherein the optical modulator is an IQ modulator in which a first Mach-Zehnder interferometer and a second Mach-Zehnder interferometer are connected in parallel and an optical phase difference of 90 degrees is provided between the first Mach-Zehnder interferometer and the second Mach-Zehnder interferometer, and a power of a first frequency component included in output light of the first Mach-Zehnder interferometer and a power of a second frequency component included in output light of the second Mach-Zehnder interferometer are monitored, and a delay of a first signal input to a first electrode segment set provided in the first Mach-Zehnder interferometer and a delay of a second signal input to a second electrode segment set provided in the second Mach-Zehnder interferometer are controlled independently.

8. The delay control circuit as claimed in claim 1, wherein the delay circuit includes a plurality of delay adjustment circuits corresponding to the plurality of electrode segments, and the control circuit sweeps delay amounts of one of two delay adjustment circuits corresponding to the two electrode segments.

9. The delay control circuit as claimed in claim 1, wherein the two electrode segments are two adjacent electrode segments.

10. The delay control circuit as claimed in claim 1, wherein the two electrode segments are selected one by one from two electrode segment groups among a plurality of electrode segment groups provided in correspondence with each bit of bit data.

11. An optical transmission apparatus comprising:

the delay control circuit as claimed in claim 1; and a digital signal processor, wherein the delay control circuit is provided between the digital signal processor and the optical modulation device.

12. The optical transmission apparatus as claimed in claim 11, further comprising:

a driver array configured to amplify the signal input to the plurality of electrode segments, wherein the delay control circuit is connected between the digital signal processor and the driver array, and the driver array amplifies a digital signal which is output from the digital signal processor and delayed by the delay control circuit, and inputs the digital signal that is adjusted of the delay to the plurality of electrode segments.

13. A delay control method comprising:

selecting two electrode segments from among a plurality of electrode segments provided in series along one or both of two waveguides of a Mach-Zehnder interferometer of an optical modulator;

inputting identical signals that vary at random to the two electrode segments that are selected;

extracting a predetermined frequency component from output light of the Mach-Zehnder interferometer;

monitoring a power of the extracted predetermined frequency component; and controlling a delay amount between the two electrode segments based on a monitored result of the power.

14. The delay control method as claimed in claim 13, further comprising:

sweeping delay amounts provided to the identical signals input to the two electrode segments, and setting a delay amount that maximizes the power of the extracted predetermined frequency component to a delay circuit.

15. The delay control method as claimed in claim 13, further comprising:

sweeping delay amounts provided to the identical signals input to the two electrode segments, and setting a delay amount, corresponding to a frequency at which the power is minimized among the extracted predetermined frequency component, as a relative delay amount between the two electrode segments, to a delay circuit.

* * * * *